March 21, 1939. T. W. FITZGERALD 2,151,654
STORAGE BATTERY CASE
Filed Aug. 13, 1936
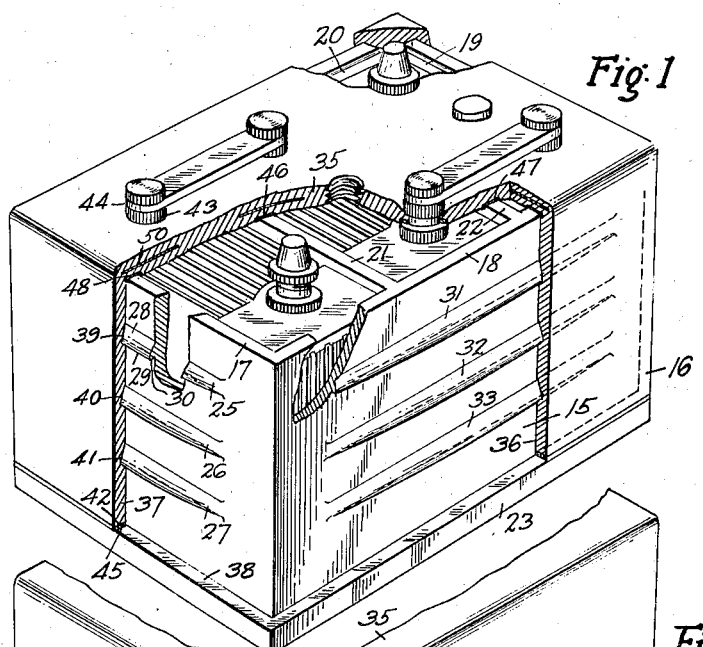
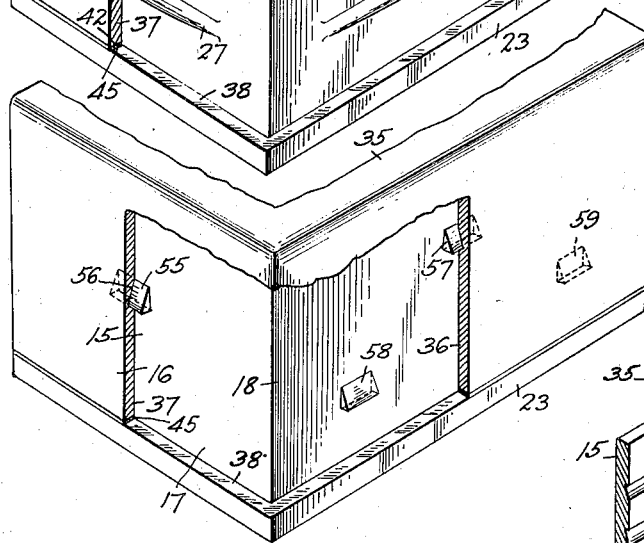
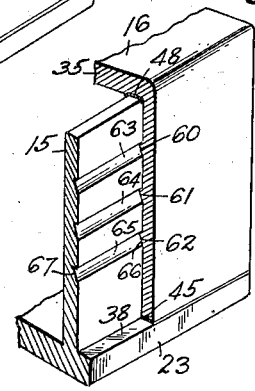
INVENTOR
Thomas W. Fitzgerald
BY
Harry Jacobson
ATTORNEY

Patented Mar. 21, 1939

2,151,654

UNITED STATES PATENT OFFICE 2,151,654

STORAGE BATTERY CASE

Thomas W. Fitzgerald, Brooklyn, N. Y., assignor of one-fourth to Harry Jacobson and three-eighths to Louis Levy, both of New York, N. Y.

Application August 13, 1936, Serial No. 95,810

9 Claims. (Cl. 136—166)

This invention relates to storage batteries and relates particularly to means for preventing removal of or tampering with the cells of a battery. Heretofore, storage batteries have been so made that the cells thereof may be removed for replacement or repair by removing the cover of the cell, and resealing with sealing compound. Unscrupulous dealers frequently have removed a defective cell and substituted another, and were able to sell the repaired battery as a new one. The customer is deceived and does not get the expected life from the battery, and consequently throws the blame on the manufacturer, not knowing that the battery he has purchased has been tampered with.

My invention therefore contemplates the provision of means for preventing access to the battery cells, so that in case the battery has so far deteriorated that one or more cells thereof must be removed for repair or replacement, the battery must be sent to the manufacturer for rebuilding or repair, or parts of the battery case must be destroyed so that the repaired battery could not be sold as a new one.

My invention further contemplates the provision of a two part interfitted and telescoped battery case, the outer part of which serves as a cover for the cells and the inner part of which serves as the holder or case for the cells, said cover and case parts being provided with concealed and inaccessible interlocking means permanently preventing disassembly of the parts after they have been once assembled.

My invention further contemplates the provision of a simple and inexpensive battery case serving as a one-piece cell cover whereby the provision of separate cell covers, the assembly thereof to the case and the necessity for sealing compound between the cell covers are eliminated.

The various objects of my invention will be clear from the description which follows, and from the drawing, in which, Fig. 1 is a perspective view partly broken away of a battery to which my invention has been applied.

Fig. 2 is a similar fragmentary view of a modified form thereof.

Fig. 3 is a similar view of another modified form thereof in which recesses are provided in the inner case part and locking projections are provided in the outer or cover part.

In the practical embodiment of my invention which I have shown by way of example and referring particularly to Fig. 1, the battery case, instead of being made in the usual form with covers for each individual cell, is instead made of two interfitted and telescoped parts comprising the inner case part 15 and the cover part 16. The inner case part 15 is in the form of a hollow box and comprises the upright walls 17, 18, 19 and 20, together with the integral transverse partitions 21 and 22 joining the sides 18 and 20. The base 23 projecting outwardly from said walls sufficiently to form the ledge 38, and is provided with the usual sediment ridges. Preferably, though not necessarily, all of the walls mentioned, together with the base and partitions 21 and 22 are molded in one piece from hard rubber, composition, or similar plastic material customarily used for battery cases.

On each of the walls 17, 18, 19 and 20 is provided a series of projections designed to engage corresponding recesses in the inner face of the cover part 16 to lock the case parts 15 and 16 together when they have been once assembled. Said projections and recesses are inaccessible and concealed when operative, and may take any desired form. They may be spaced at any convenient point in the surfaces of said case parts, and as many or as few of said projections may be used as may be found desirable. As shown, the wall 17 is provided with three parallel projections 25, 26 and 27. Each of said projections is integral with its wall and is of substantially triangular cross section being provided with an inclined outer face 28 extending up to the projecting edge 29 thereof, and being provided with a substantially horizontal locking edge 30. The edge 30 may be of its greatest width at about the middle point thereof and is gradually reduced in width toward each end thereof, so that the surface 28 becomes slightly convex. The lengths of the projections 25, 26 and 27 may all be substantially the same, or the projections may be of different lengths as desired, it being desirable only that there be a sufficient overhang of the projection from the outer surface of the wall to provide the maximum width of the locking edge at about the middle line of said wall. Similarly, the wall 18 may be provided with similar projections 31, 32 and 33, while the walls 19 and 20 may also be provided with the similar projections, if desired.

The cover part 16 is preferably made in one piece and in the form of a box having an open bottom, being provided with a top or cover 35, a side wall 36, a corresponding opposed side wall, an end wall 37 joining the side walls, and another opposed end wall. The thicknesses of the side walls and of the end walls is preferably the same as the width of the ledge 38 projecting from the base 23 of the inner case part 15 to form a smooth and uninterrupted outer surface on the battery and preventing tampering with the locking projections. In the wall 37, are provided the recesses 39, 40 and 41 shaped correspondingly to the respective projections 25, 26 and 27 and designed to receive said projections in such manner that when the case parts 15 and 16 are assembled, the inner surface of the wall 37 is in substantial engagement with the outer surface of the wall 17, and the other corresponding walls of the inner and outer case parts are in similar engagement, the respective projections entering the corresponding registering recesses. The cover part 16 is also made as by molding, preferably of a single piece of hard vulcanized rubber or the like material, which though comparatively rigid, still nevertheless has sufficient inherent spring to permit the walls thereof to be sprung slightly. When the cover part is forced down over the inner case part 15, said walls are bent slightly outwardly by the various projections until the lowermost edge 42 of the cover part 16 reaches the ledge 38 whereupon said walls automatically spring inwardly and the various projections enter the recesses to lock the inner and outer case parts permanently together. If the material from which the case is made has little or no spring, such as, for example, certain types of composition, then the cover part 16 may be steamed or soaked in hot water to soften it prior to its assembly with the case part 15. Such softening of the outer case part insures the springing of the walls thereof sufficiently to permit the cover part to be forced over the projections and to become inseparably joined to the inner case.

In the uppermost wall of the cover part, are molded suitable openings as 43 for the passage of the battery terminals 44, as well as the usual threaded openings for the insertion of water into the cells.

To prevent leakage between the case parts 15 and 16 suitable gaskets preferably of soft rubber, are provided between the various adjacent edges and horizontal surfaces thereof. For example, the gasket 45 is interposed between the lowermost edge 42 of the cover 16 and the ledge 38 of the part 15. Similarly, a gasket 46 is provided above the upper edge of the partitions 21 and enters a suitable groove in the inner surface of the top 35, said groove being of sufficient width to permit the gasket to slightly overhang the edges of said partition and to provide a proper seal between the cover wall 35 and the top of the partition.

The gasket 47 is similarly inserted in the cover wall 35 and above the partition 22. Similarly, the top edges of the walls 17, 18, 19 and 20 are sealed by a similar gasket 48, though it will be understood that the gaskets 46, 47 and 48 are preferably made of a single piece of material.

It will be understood that no separate cover is needed for any of the battery cells and therefore, no sealing compound is necessary in a battery made in accordance with my invention, since the cover wall 35 is of a single piece of material integral with the various walls depending therefrom. It will further be understood that the cover wall 35 is made of sufficient thickness to withstand the various stresses put thereupon, since said cover wall takes some of the weight put upon the battery when the battery is manipulated or carried about. Suitable seals such as nuts and gaskets are provided where the terminals come through the cover wall 35, the nuts also serving to transmit part of the weight of the battery to the cover. It will further be understood that the upright walls 17—20 of the inner case are made as thin as possible so that the inner case cannot be used in safety except in connection with the outer case. The height of the walls 17—20 of the inner case is such that they project somewhat above the acid level over the plates of the various cells so that a test charge can be given to the battery before the cover part is forced on. If any defects are ascertained by the test charge or otherwise, such as a disarrangement of the plates or separators, or a poorly burned connection, the defects may be remedied before the cover part 16 is arranged in place. Once the cover part 16 is sprung or forced into place, the case is automatically sealed and locked without the necessity for the use of sealing compound or for the use of separate cell covers and the assembly of such covers to the case.

In that form of my invention shown in Fig. 2, the ledges 25, 26 and 27 are shown as greatly reduced in length, a single projection as 55 being substituted therefor in the side walls 17 and 19. Said projection is arranged at such a point in the wall 17 as to insure the desired springing action of the corresponding wall of the cover part 16 and the proper interlocking of said projection in the recess 56. Similarly, in the longer wall 18, there may be provided the central projection 57 and the projections 58 and 59 which are preferably of less thickness than the projection 57. A projection similar to the projection 55 may be made on the wall 19, and a projection similar to the projections 57, 58 and 59 may be arranged on the wall 20. Regardless, however, of the length, width, thicknesses and arrangement of said projections, the inner and outer case parts are assembled in the same manner as above described in connection with Fig. 1.

As shown in Fig. 3, the projections 60, 61 and 62 may be arranged to project from the inner surfaces of the walls of the outer case part 16, and to fit into corresponding recesses 63, 64 and 65 made in the outer surfaces of the walls of the inner case part. In this form of my invention, the surfaces 66 of the projections and the corresponding surfaces 67 of the recesses are inclined upwardly and inwardly so that the parts may be properly assembled. The reversal of the projections and recesses, however, does not affect the efficiency of my new case except that the walls of the inner case part should in this form be slightly thicker than in the form shown in Fig. 1.

It will be seen that I have provided simple and efficient means for locking the parts of a battery together to prevent the removal of any of the cells thereof, and that I have provided a structure well designed to meet the requirements of practical use.

While I have shown and described certain specific embodiments of my invention, I do not wish to be understood as limiting myself thereto, but intend to claim my invention as broadly as may be permitted by the state of the prior art and the scope of the appended claims.

I claim:

1. In a storage battery, a molded one-piece hard rubber outer case part in the form of a hollow rectangular prism, an inner rigid part in the form of a hollow rectangular prism telescoped into the outer part, a plurality of rectangular battery cells in said inner part, one of said parts having a plurality of vertically and horizontally spaced recesses therein, each having a horizontal locking surface and having an inclined wall meeting said surface, said inclined wall being arranged intermediate the faces of said one part, at least one of the recesses being below the acid level of said cells, and means for locking said parts together against possibility of disassembly except by destruction thereof in the assembled position of said parts comprising a plurality of projections molded in one piece with and extending from the other of said parts, each of said projections having a horizontal locking surface engaging a corresponding locking surface of one of said recesses in the assembled positions of said parts and also having an inclined outermost surface adapted to engage and of substantially the same inclination as said inclined wall of a corresponding recess, said locking surfaces being of less width than the thickness of said one part, whereby said projections are inaccessibly arranged between the parts, said parts being sufficiently rigid and brittle to fracture on any attempt to forcibly separate said parts sufficiently to disengage said projections from said recesses, but being slightly flexible and of material softening when heated to permit the midportions of the walls of said parts to bulge whereby said parts may be telescoped together.

2. In a storage battery, a rigid inner member having a pair of parallel end walls and a pair of parallel side walls integrally joining the end walls, a molded one-piece substantially rigid and brittle outer covering member, said outer member also having parallel end walls and parallel side walls and having a top wall integral with the end and side walls, and inseparable locking means for said members comprising wedge-shaped projections extending from and molded integrally with the walls of one of said members, said projections terminating inwardly of the upright corners of said walls and being in vertical and horizontal spaced relation and being rigid and integral with and immovable relatively to the walls from which they extend, there being recesses of the same size and shape as the corresponding projection in the adjacent wall of the other of said members, said projections entering and filling said recesses and being fixed relatively thereto against relative movement in any direction after said members have been telescoped together, said projections being inseparably interlocked in the recesses and concealed between said members and being inaccessible from the outside of the battery and from the inside of said inner member, whereby said members are held against separation except by destruction thereof and are also held against disassembly and reassembly, said members being of material softening when heated.

3. In a storage battery, a substantially rigid hard rubber rectangular outer case open at its bottom and having cell connections thereon and openings therein for the passage of the battery terminals and for the insertion of water, each of the walls of the case having a series of vertically spaced and horizontally extending recesses in the inner surface thereof, each of said recesses being of less length than the width of the wall in which it is made, and being deepest at its middle and decreasing in depth at its ends, a rigid inner case open at its top and telescoped into the outer case, and a series of projections in vertically spaced relation to and integral with the walls of the inner case and extending outwardly therefrom and entering and filling the corresponding recesses, said cases being adapted to be telescoped together solely by relative vertical movement, the outer case being adapted when heated to soften to a sufficient extent to permit the midportions of the walls thereof to bulge to the required extent to pass said projections, and means for obstructing the joint between said cases to prevent the passage of a tool between the cases and the forcible separation thereof, said cases being sufficiently brittle to fracture on an attempt to forcibly separate them.

4. A storage battery case comprising a rigid inner part having an open top and relatively perpendicular side and end walls, a molded rigid and brittle outer part having a top wall closing said open top and having integrally joined and relatively perpendicular side and end walls extending integrally from the top wall and in contact with and completely covering the side and end walls of the inner part, and concealed cooperating means on the adjacent walls of said parts holding them together against separation comprising a series of projections extending integrally from and immovable relatively to the side and end walls of one part, each of said projections having a substantially flat lower edge face arranged at substantially right angles to the faces of said walls and each projection having a remaining outer surface arranged at an acute angle to said edge face, the other of said parts having a series of recesses in the side and end walls thereof of the same shape and size as the corresponding projections, said parts yielding sufficiently when heated on the forcible vertical relative telescoping movement of said parts to permit the projections to pass over the wall of the other part until all the projections are brought into position to enter the corresponding recesses.

5. In a multiple cell storage battery, a case comprising a one-piece rigid cell holding part having flat substantially rectangular walls terminating in an open top and otherwise closed and having parallel spaced partitions therein and battery cells between the partitions, a one-piece brittle hard rubber cover part closing said open top and having integral flat substantially rectangular walls fitted about and in direct unbonded contact with the walls of the cell holding part, the walls of said case being of insufficient thickness to serve safely as the only walls of the battery without the aid of the walls of the case, said top having openings therein for the supply of water to the cells, and concealed inaccessible preformed rigid elements on said parts arranged below the acid level of said battery cells on the adjacent walls of said parts in position to interlock automatically and permanently in the assembled position of said parts on the assembly of said parts solely by relative vertical movement, said interlocking elements being provided with interengaging horizontal surfaces of less width than the thickness of the walls of either of said parts preventing upward disassembling movement of said case and removal of said cells from the case after said edges have become interengaged, said walls preventing relative rotational movement of said parts, and said parts being molded of plastic material softening when heated.

6. In a multiple cell storage battery, a one-piece hollow inner case member having rectangular walls and rectangular parallel spaced partitions, said member being open at the top and otherwise closed and having a horizontal ledge projecting outwardly from the lower end thereof, a second one-piece hollow outer case member having a top devoid of sealing compound and depending rectangular walls and open at the bottom, said members being molded of substantially inflexible material and being comparatively brittle but being adapted to soften when heated to facilitate the assembly of said members together, one of said members having a plurality of preformed recesses in the walls thereof, each of less depth than the thickness of said walls, and inaccessible rigid means for permanently locking said members together against separation except by destruction after said outer case member has been forced down over the inner case member to close the open top thereof and to carry the lowermost edge thereof against said ledge, said means comprising a plurality of wedge shaped discontinuous rigid elements in vertical spaced relation and integral with and projecting from those wall surfaces of the other of said members adjacent said one member, said elements being of the same size and shape as that of said recesses and filling said recesses and each of said elements and recesses having a horizontal locking surface and a single inclined surface, said ledge being spaced from the lowermost of said elements a distance not less than that between the uppermost of said elements and the top of said second member, to prevent the insertion of a tool between said lowermost edge and said ledge and into engagement with said elements and to prevent such tool from spreading said members apart sufficiently to disengage the elements from the recesses without breaking said comparatively brittle members.

7. A storage battery comprising an inner case member provided with partitions forming cell compartments each open at the top, said member having a rectangular bottom and upstanding rectangular walls, a cell in each compartment, and means devoid of sealing compound for closing the open tops of said compartments, for protecting the inner case member, and for preventing access to and removal of said cells comprising a molded substantially rigid one-piece outer case member having a top and integral dependent walls, a water supply opening for each cell and cell connections thereon, and concealed and inaccessible means for locking said case members together against separation when assembled comprising discontinuous, preformed, rigid projecting elements integral with one of said members and entering and filling correspondingly shaped recesses in the other member, each of said recesses having an inclined wall in engagement substantially throughout with a corresponding inclined wall of one of the projections, at least one of said recesses being below the acid level of said cells, said case members being of material softening when heated and the walls of the inner case member being of insufficient thickness to serve safely and alone as the walls of the battery.

8. In a storage battery, a brittle, rigid, hard rubber member having upright walls, preformed projections triangular in cross-section extending integrally with and at vertically and horizontally spaced intervals from the walls and intermediate the upright corners of said walls, each of said projections having an inclined outermost flat wall, and a second brittle and rigid member having upright walls each provided with recesses adapted to receive said projections when said members are assembled solely by relative vertical movement, at least one of said recesses being below the acid level of the battery, each of said recesses having an inclined flat wall adapted to engage the inclined wall of a projection, said recesses and said projections having interengaging horizontal edges for permanently locking said members together, and the walls of said inner member being of insufficient thickness to serve safely and alone as the walls of the battery.

9. In a storage battery case, a one-piece molded and comparatively brittle inner case member having side and end walls, a base at the bottom of said member outwardly overhanging said walls, dividing partitions on said member, integral rigid projections of triangular cross-section extending outwardly from the outer surfaces of said walls at vertical and horizontal spaced intervals and intermediate the upright corners of said walls, an inclined outer surface on each of the projections, a horizontal locking surface on each projection extending inwardly from the inclined surface, an outer one-piece molded and comparatively brittle cover member having a top and integral walls depending from the top to said base and adapted completely to cover the top and walls of the inner member when said members are telescoped together, the inner surfaces of the walls of said cover member each having a recess therein of the same size and triangular cross-sectional shape as that of the corresponding projections of the inner member, the projections entering and filling said recesses when said members are assembled to lock the members permanently together against removal of material from between said partitions without destruction of the outer member, said members being of material softening when heated to facilitate the telescoping assembly thereof, a gasket between the overhanging part of said base and the lowermost edges of the walls of the cover member, and a gasket between the upper surface of the inner member and entering a groove in the inner surface of the top of the cover member.

THOMAS W. FITZGERALD.